United States Patent
Wu et al.

(10) Patent No.: US 9,451,288 B2
(45) Date of Patent: Sep. 20, 2016

(54) INFERRED KEY FRAMES FOR FAST INITIATION OF VIDEO CODING SESSIONS

(71) Applicant: Apple Inc., Cupertino, CA (US)

(72) Inventors: Hsi-Jung Wu, San Jose, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 636 days.

(21) Appl. No.: 13/631,793

(22) Filed: Sep. 28, 2012

(65) Prior Publication Data

US 2013/0329798 A1    Dec. 12, 2013

Related U.S. Application Data

(60) Provisional application No. 61/657,681, filed on Jun. 8, 2012.

(51) Int. Cl.
| | |
|---|---|
| *H04N 7/12* | (2006.01) |
| *H04N 19/65* | (2014.01) |
| *H04N 19/105* | (2014.01) |
| *H04N 19/172* | (2014.01) |
| *H04N 19/107* | (2014.01) |

(52) U.S. Cl.
CPC ............ *H04N 19/65* (2014.11); *H04N 19/105* (2014.11); *H04N 19/107* (2014.11); *H04N 19/172* (2014.11)

(58) Field of Classification Search
USPC ..................................................... 375/240.12
See application file for complete search history.

(56) References Cited

U.S. PATENT DOCUMENTS

| | | | |
|---|---|---|---|
| 5,592,228 A | 1/1997 | Dachiku et al. | |
| 6,081,551 A | 6/2000 | Etoh | |
| 8,090,025 B2 | 1/2012 | Sakazume | |
| 2001/0024473 A1 | 9/2001 | Nakaya et al. | |
| 2002/0018525 A1* | 2/2002 | Nishi et al. | 375/240.27 |
| 2002/0140805 A1* | 10/2002 | Gutta et al. | 348/40 |
| 2002/0191112 A1* | 12/2002 | Akiyoshi et al. | 348/700 |
| 2004/0141206 A1* | 7/2004 | Kim | 358/1.17 |
| 2005/0257239 A1* | 11/2005 | Evans et al. | 725/88 |
| 2006/0098738 A1 | 5/2006 | Cosman et al. | |
| 2006/0294171 A1 | 12/2006 | Bossen et al. | |
| 2008/0056358 A1* | 3/2008 | Fuchie et al. | 375/240.12 |
| 2008/0232470 A1* | 9/2008 | Park et al. | 375/240.12 |
| 2008/0247463 A1 | 10/2008 | Buttimer et al. | |
| 2009/0180542 A1* | 7/2009 | Leprovost et al. | 375/240.16 |
| 2009/0225193 A1* | 9/2009 | Ishii | 348/231.99 |

(Continued)

OTHER PUBLICATIONS

Paul et al., "Explore and Model Better I-Frames for Video Coding," IEEE Transactions on Circuits and Systems for Video Technology, 21(9):1242-1254, Sep. 2011.

*Primary Examiner* — Tracy Li (74) *Attorney, Agent, or Firm* — Baker & Hostetler, LLP (57) ABSTRACT

A video coding system may initiate coding of a new coding session with reference to an "inferred key frame" that is known both to an encoder and a decoder before a coding session begins. The inferred key frame need not be transmitted between the encoder and decoder via the channel. Instead, the inferred key frame may be stored locally at the encoder and the decoder. Frames coded at the onset of a video coding session may be coded with reference to the inferred key frame, which increases the likelihood a decoder will receive a frame it can decode properly and accelerate the rate at which the decoder generates recovered video data. Inferred key frames may be used as prediction references to recover from transmission errors.

27 Claims, 6 Drawing Sheets

(56) References Cited

U.S. PATENT DOCUMENTS

| | | |
|---|---|---|
| 2009/0251528 A1 | 10/2009 | Friel et al. |
| 2009/0323801 A1 | 12/2009 | Imajou |
| 2010/0034379 A1* | 2/2010 | Nakane .................. 380/236 |
| 2010/0239000 A1 | 9/2010 | MacDonald et al. |
| 2010/0296579 A1* | 11/2010 | Panchal et al. ......... 375/240.15 |
| 2010/0329336 A1 | 12/2010 | Sohn et al. |
| 2011/0150090 A1 | 6/2011 | Hugosson et al. |
| 2011/0170611 A1 | 7/2011 | Lai et al. |
| 2011/0261882 A1 | 10/2011 | Zheng et al. |
| 2012/0275514 A1 | 11/2012 | Leontaris |

* cited by examiner

INFERRED KEY FRAMES FOR FAST INITIATION OF VIDEO CODING SESSIONS

CROSS-REFERENCE TO RELATED APPLICATIONS

The present invention benefits from the priority of U.S. application Ser. No. 61/657,681, entitled "Inferred Key Frames for Fast Initiation of Video Coding Sessions, filed Jun. 8, 2012, the disclosure of which is incorporated herein in its entirety.

BACKGROUND

The present disclosure relates to predictive video coders and, in particular, to techniques for reliable initiation of video coding sessions in the face of unpredictable network bandwidth and/or channel errors.

Predictive video coding systems exploit spatial and temporal redundancy in video content by coding image content of one frame with reference to image content of other previously-coded frames. For example, when a new frame is coded as a "P frame," the new frame relies on a single previously-coded frame (called a "reference frame") as a basis of prediction. Alternatively, when a new frame is coded as a "B frame," the new frame relies on a pair of previously-coded reference frames as a basis of prediction. Coding new frames predictively conserves bandwidth because the new frame can be coded with fewer bits than would be required to code the new frame without such prediction references.

The reference frames are members of a common coding session as the frames being coded. Thus, a given frame may be coded predictively with respect to a first set of reference frames and may be transmitted from an encoder to a decoder. The same frame may itself be designated as a reference frame, in which case the frame may serve as a prediction reference for other frames that are coded later. An encoder and decoder both locally store copies of decoded reference frames for use in predictive coding.

Reference frames are not available within a video coding system when a new coding session is first established. Conventionally, many coding protocols require a first frame to be coded as an instantaneous decoder refresh ("IDR") frame. A frame coded as an IDR frame typically requires a greater number of bits to code than the same frame coded as a P or B frame. Moreover, an IDR frame resets decoder states, which forces the coding system to code all subsequently-processed frames predictively with respect to the IDR frame or to another frame that depends from the IDR frame.

Modern video coders communicate over networks that have variable bandwidth available to carry coded data and that are susceptible to communication errors. The unpredictable nature of the networks can cause significant latency in the speed at which coding systems can establish new coding sessions. If an encoder codes and transmits a first IDR frame that is lost during transmission, the decoder cannot decode the IDR frame successfully. An encoder may not be notified of the failed transmission until after it has coded (and perhaps transmitted) many other frames using the IDR frame as a basis of prediction. If the encoder attempts to code another frame as an IDR frame, the second IDR frame will reset the decoder and the decoder will not be able to make use of any frames that were coded prior to the second IDR frame and received successfully. The encoder and decoder may exchange a significant amount of coded video data that cannot be used by a decoder until the decoder receives and successfully decodes a first IDR frame. Thus, there may be a perceptible latency to the rendering of video data after initialization of a video coding session, which may be perceived as annoying to operators of coding systems.

DETAILED DESCRIPTION

A video coding system may initiate coding of a new coding session with reference to an "inferred key frame" that is known both to an encoder and a decoder before a coding session begins. The inferred key frame need not be transmitted between the encoder and decoder via the channel. Instead, the inferred key frame may be stored locally at the encoder and the decoder. Frames coded at the onset of a video coding session may be coded with reference to the inferred key frame, which increases the likelihood a decoder will receive a frame it can decode properly and accelerate the rate at which the decoder generates recovered video data. Inferred key frames may be used as prediction references to recover from transmission errors, also.

A video coding system may initiate coding of a new coding session with reference to an "inferred key frame" that is known both to an encoder and a decoder before coding processes begin. The inferred key frame need not be transmitted between the encoder and decoder via the channel. It may arise from several sources:

In one embodiment, the inferred key frame may be a frame having no image content. For example, the inferred key frame may be a frame having uniform content at all pixel locations within the frame (e.g., entirely white, entirely black or entirely grey across the frame).

In another embodiment, the inferred key frame may be recalled from a prior coding session between the encoder and a decoder. The inferred key frame may be stored from a last reference frame or last IDR frame that was exchanged between the encoder and the decoder in the prior coding session, which was stored prior to termination of the prior coding session.

In a further embodiment, the inferred key frame may be stored by a contacts manager that operates at the encoder and decoder, each device storing image content associated with the other device.

Video coding may begin using the inferred key frame as a prediction reference for other frames. Thus, a decoder may begin to decode video and use results of the decoding operations as soon as it receives valid data coded with reference to the inferred key frame.

Figure 1:
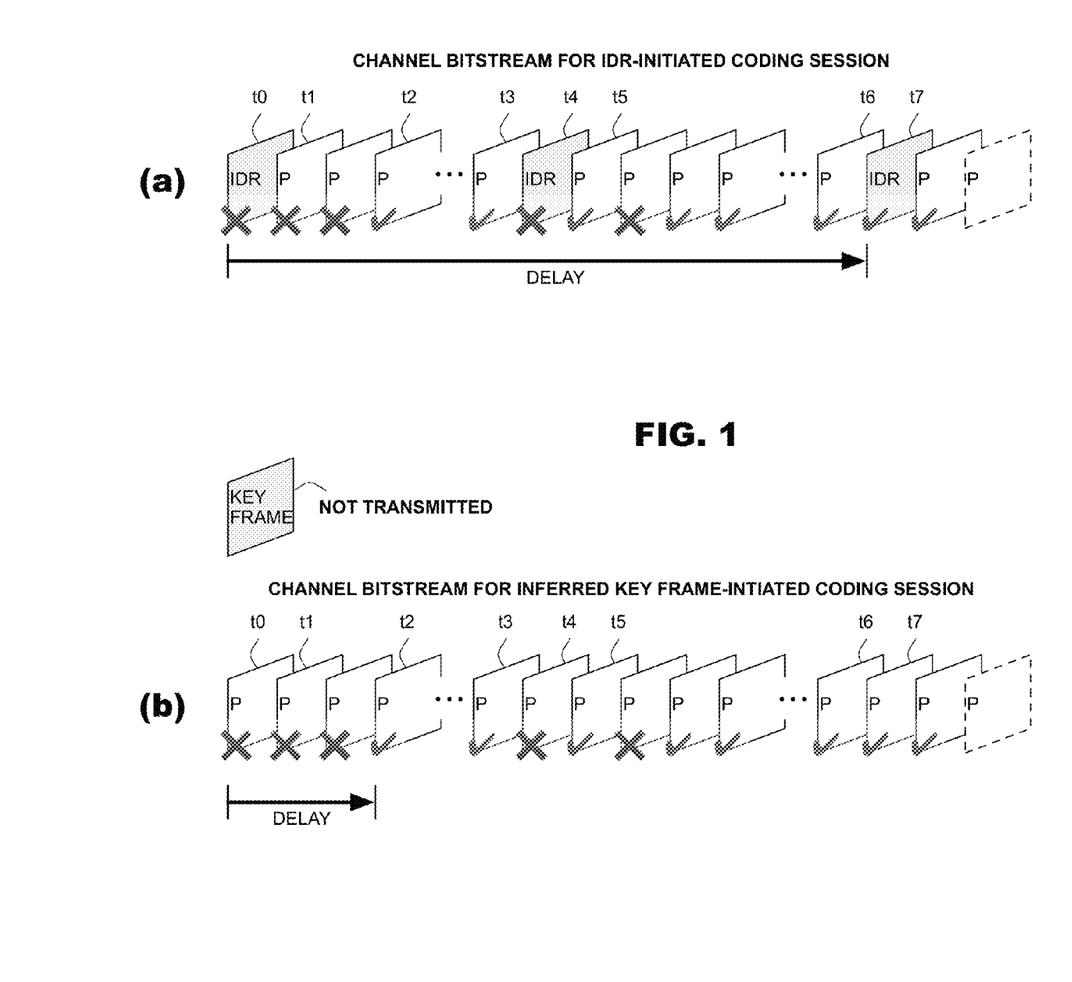
FIG. 1 illustrates exemplary coding sessions of an IDR-based coding system and an inferred key frame-based coding system in the presence of transmission errors.

FIG. 1 illustrates exemplary coding sessions of an IDR-based coding system and an inferred key frame-based coding system, both in the presence of transmission errors. FIG. 1(a) illustrates operation of the IDR-based coding system. Coding may begin at time $t_0$ with coding of a first IDR frame. Thereafter, from times $t_1$ to $t_3$, the IDR-based coder may code a variety of other frames (shown as P frames) that rely on the IDR as a basis of prediction, either directly or indirectly. In the example of FIG. 1(a), all frames prior to the frame transmitted at time $t_2$ are lost due to communication errors. Frames transmitted starting at time $t_2$ may be received properly at the decoder but the decoder cannot decode them because the decoder did not receive and successfully decode the IDR frame coded at time $t_0$.

FIG. 1(a) illustrates coding of another frame as an IDR frame at time $t_4$. In this example, the IDR frame at time $t_4$ is not successfully received or decoded by the decoder. All frames coded thereafter, shown from times $t_5$ to $t_6$, could not be decoded even if they were successfully received because they would depend upon the IDR frame at time $t_4$ which was lost. FIG. 1(a) illustrates another frame coded as an IDR frame at time $t_7$ and successfully decoded by the decoder. Once the IDR frame at time $t_7$ is received, coding may begin.

FIG. 1(b) illustrates operation of a coding system that may operate using inferred key frames in the presence of similar channel errors. All frames from times $t_0$ through $t_7$ are shown coded as P frames that depend, either directly or indirectly, upon an inferred key frame, which is available locally to both the encoder and decoder. The inferred key frame need not be transmitted between the encoder and decoder to begin transmission.

FIG. 1(b), like FIG. 1(a), illustrates transmission errors that prevent all frames prior to the frame at time $t_2$ from being successfully received and decoded. Frames may be successfully received starting at time $t_2$. If the frame at time $t_2$ directly relies on the inferred key frame for prediction, then the decoder may decode that frame immediately and render it. This allows the coding system operating according to inferred key frames to begin substantive coding earlier than an IDR-based system.

Figure 2:
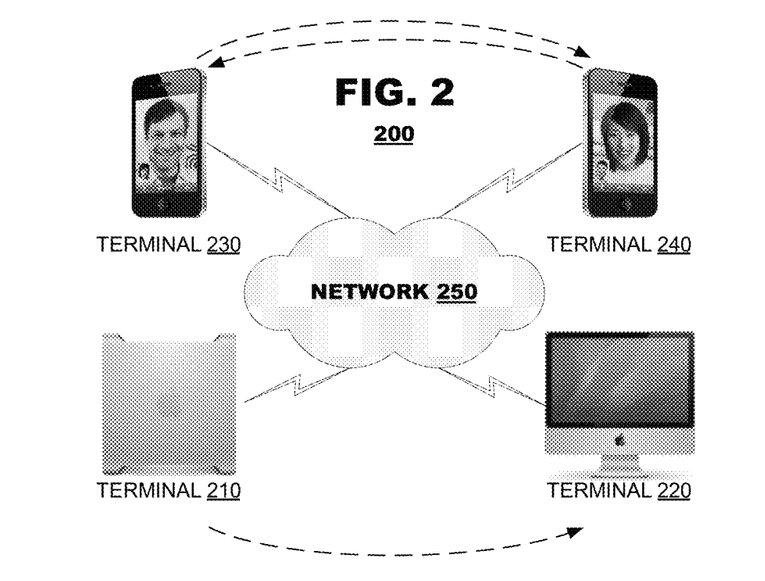
FIG. 2 illustrates a simplified block diagram of a video coding system according to an embodiment of the present invention.

FIG. 2 illustrates a simplified block diagram of a video coding system 200 according to an embodiment of the present invention. The system 200 may include at least two terminals 210, 220 interconnected via a network 250. For unidirectional transmission of data, a first terminal 210 may code video data at a local location for transmission to the other terminal 220 via the network 250. The second terminal 220 may receive the coded video data of the other terminal from the network 250, decode the coded data and display the recovered video data. Unidirectional data transmission is common in media serving applications and the like.

FIG. 2 illustrates a second pair of terminals 230, 240 provided to support bidirectional transmission of coded video that may occur, for example, during videoconferencing. For bidirectional transmission of data, each terminal 230, 240 may code video data captured at a local location for transmission to the other terminal via the network 250. Each terminal 230, 240 also may receive the coded video data transmitted by the other terminal, may decode the coded data and may display the recovered video data at a local display device.

In FIG. 2, the terminals 210-240 are illustrated as servers, personal computers and smart phones but the principles of the present invention are not so limited. Embodiments of the present invention find application with laptop computers, tablet computers, media players and/or dedicated video conferencing equipment. The network 250 represents any number of networks that convey coded video data among the terminals 210-240, including, for example, wireline and/or wireless communication networks. The communication network 250 may exchange data in circuit-switched and/or packet-switched channels. Representative networks include telecommunications networks, local area networks, wide area networks and/or the Internet. For the purposes of the present discussion, the architecture and topology of the network 250 is immaterial to the operation of the present invention unless explained hereinbelow.

Figure 3:
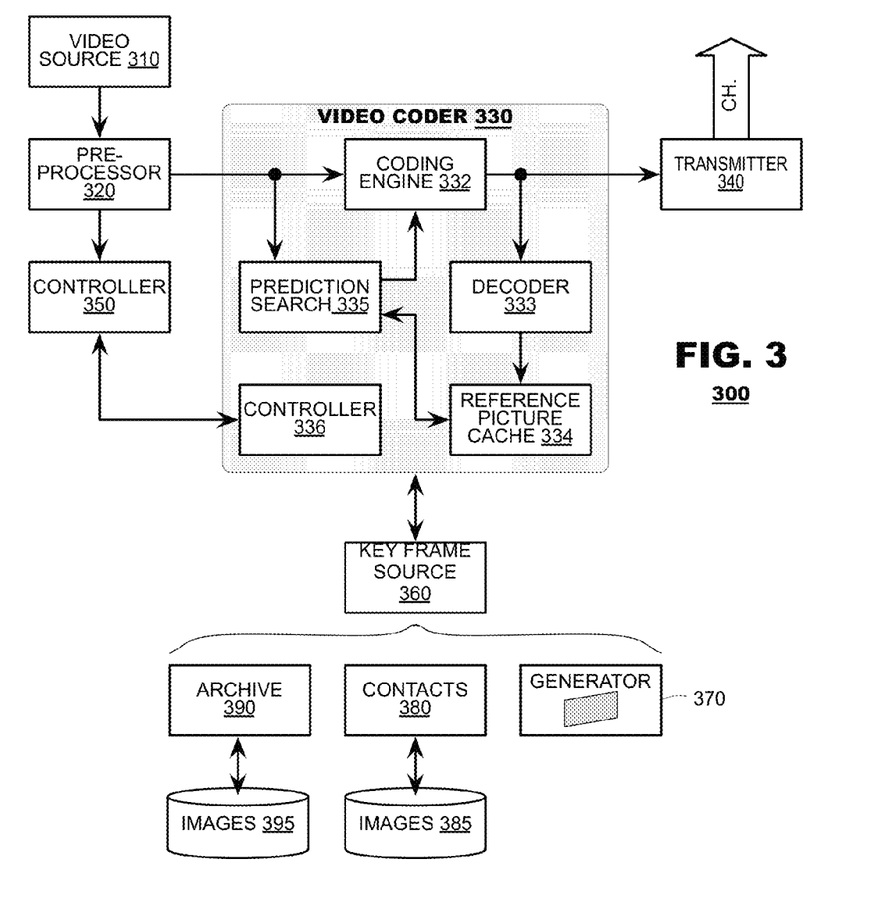
FIG. 3 is a functional block diagram of a video encoding system according to an embodiment of the present invention.

FIG. 3 is a functional block diagram of a video encoding system 300 according to an embodiment of the present invention. The system 300 may include a video source 310, a pre-processor 320, a video coder 330, a transmitter 340, a controller 350 and a key frame source 360. The video source 310 may capture image information and generate video data therefrom. The pre-processor 320 may perform analytical and signal conditioning operations on the video data to prepare it for coding. The video coder 330 may perform coding operations on the video sequence to reduce its bit rate. The transmitter 340 may prepare the coded video and prepare it for transmission to a decoder (not shown). The controller 350 may manage operations of the system 300.

The key frame source 360 may supply key frame data to the video coder 330 at predetermined events during a coding session, for example, when starting a session or when a transmission error is detected.

As indicated, the video source 310 may provide video to be coded by the system 300. In a media serving system, the video source 310 may be a storage device storing previously prepared video. In a videoconferencing system, the video source 310 may be a camera that captures local image information as a video sequence. Thus, different embodiments of the system 300 may, but need not, provide for real time coding of input video.

The pre-processor 320 may perform various analytical and signal conditioning operations on video data. For example, the pre-processor 320 may search for video content in the source video sequence that is likely to generate artifacts when the video sequence is coded, decoded and displayed. The pre-processor 320 also may apply various filtering operations to the frame data to improve efficiency of coding operations applied by a video coder 330.

The video coder 330 may perform coding operations on the video sequence to reduce the sequence's bit rate. For example, the video coder 330 may perform motion compensated video compression that exploits spatial and/or temporal redundancies in the video data. The video coder 330 may include a coding engine 332, a local decoder 333, a reference picture cache 334, a prediction search unit 335 and a controller 336. The coding engine 332 may code the input video data by exploiting temporal and spatial redundancies in the video data. As part of its operation, the video coder 330 may designate certain frames to be "reference frames," which can serve as prediction references for later-received video data. The coding engine 332 may perform motion compensated predictive coding, which may involve coding differences between pixel blocks of an input frame and pixel blocks of a reference frame that is selected as a prediction reference.

The local decoder 333 may decode coded video data of frames that are designated as reference frames. Thus, the local decoder 333 may generate a recovered frame from the coded video data which, in the absence of transmission errors, will match content of a recovered frame as generated by a decoder (not shown) that receives the coded data. The reference picture cache 334 may store reconstructed reference frame data output by the local decoder 333.

The predictor 335 may search the reference picture cache 334 for image data to serve as a prediction reference for new frames as they are coded.

The controller 336 may manage coding operations of the video coder 330, including, for example, selection of coding parameters to meet a target bit rate of coded video.

During coding, the controller 350 may assign to each frame a certain frame type, which can affect the coding techniques that are applied to the respective frame. For example, frames often are assigned to as one of the following frame types:

An Intra Frame (I frame) is one that is coded and decoded without using any other frame in the sequence as a source of prediction, A Predictive Frame (P frame) is one that is coded and decoded using earlier frames in the sequence as a source of prediction, A Bidirectionally Predictive Frame (B frame) is one that is coded and decoder using both earlier and future frames in the sequence as sources of prediction.

Frames commonly are parsed spatially into a plurality pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frame. For example, pixel blocks of I frames can be coded non-predictively or they may be coded predictively with reference to pixel blocks of the same frame (spatial prediction). Pixel blocks of P frames may be coded non-predictively, via spatial prediction or via temporal prediction, with reference to one previously-coded reference frame. Pixel blocks of B frames may be coded non-predictively, via spatial prediction or via temporal prediction with reference to one or two previously-coded reference frames.

As discussed, the key frame source 360 may supply key frame data to the video coder 330. Three embodiments are illustrated in FIG. 3. In a first embodiment, the key frame source 360 simply may be a frame generator 370 that generates an image having uniform content (e.g., white, black or grey). In this embodiment, the key frame has no image content.

In a second embodiment, the key frame source 360 may include a contacts manager 380 and storage 385 for contact images. In this embodiment, responsive to a decoder identifier (source not shown), the key frame source 360 may retrieve an image associated with the decoder and supply the image to the video coder 330. The contact image may be, for example, a picture of an operator that uses the decoder.

In another embodiment, the key frame source 360 may include an archive manager 390 and storage 395 for images generated in a prior coding session between the encoder and decoder. In this embodiment, responsive to a decoder identifier (source not shown), the key frame source 360 may retrieve an image from the archive storage and may supply the image to the video coder 330.

In a video coding system (FIG. 2) that supports transmission of video in a single direction only, a video encoding system 300 as illustrated in FIG. 3 may be supplied in a transmitting terminal 210 only. In a video coding system that supports bidirectional transmission of video, both terminals 230, 240 may include their own video encoding systems 300.

Figure 4:
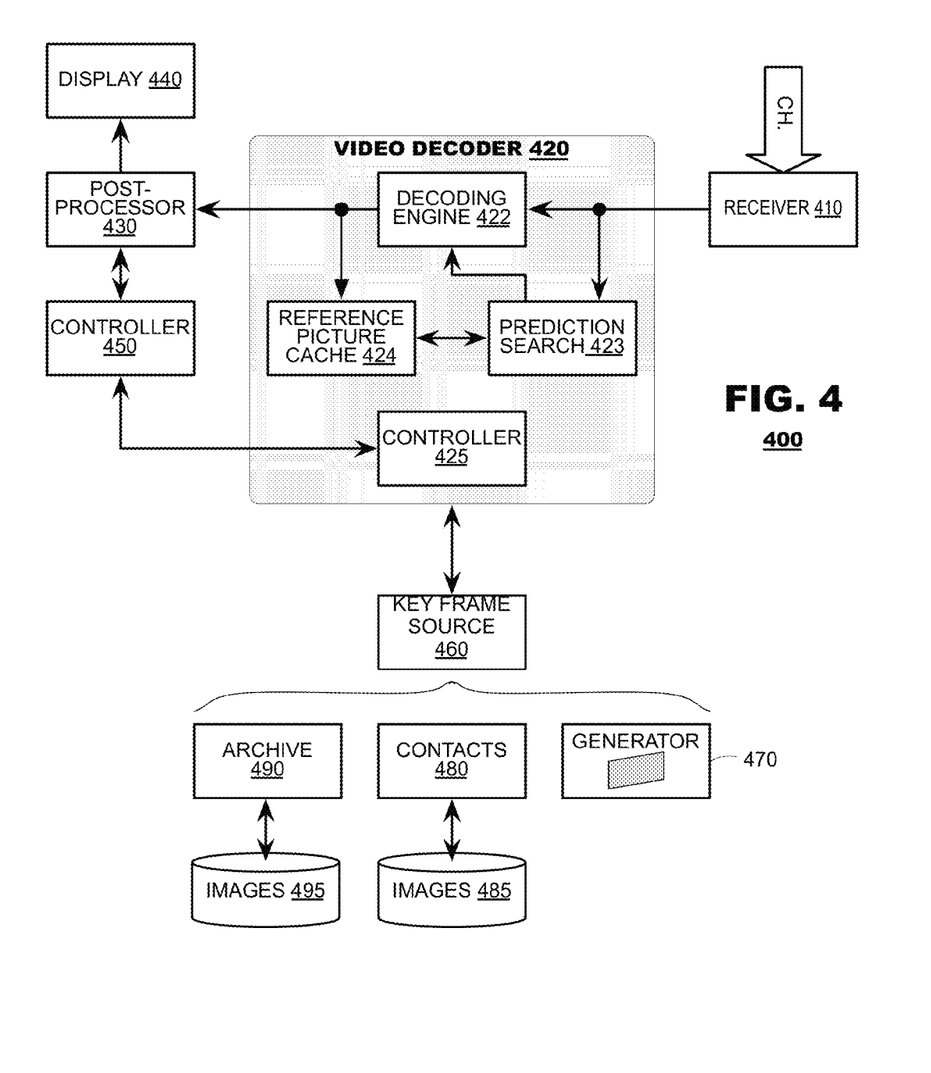
FIG. 4 is a functional block diagram of a video decoding system according to an embodiment of the present invention.

FIG. 4 is a functional block diagram of a video decoding system 400 according to an embodiment of the present invention. The system 400 may include a receiver 410, a video decoder 420, a post-processor 430, a display 440, a controller 450 and a key frame source 460. The receiver 410 may receive coded video data from the channel and provide it to the video decoder 420. The video decoder 420 may invert coding operations applied by a video coder (not shown) and may generate recovered video data therefrom. The post-processor 430 may apply other processing operations to the recovered video data prior to rendering via the display 440. The controller 450 may manage operations of the system 400. The key frame source 460 may provide key frames to the video decoder 420 as directed by channel data.

As indicated, the receiver 410 may receive coded video data from a channel. The coded video data may be included with channel data representing other content, such as coded audio data and other metadata. The receiver 410 may parse the channel data into its constituent data streams and may pass the data streams to respective decoders, including the video decoder.

The video decoder 420 may generate recovered video data from the coded video data. The video decoder 420 may include a decoding engine 422, a prediction search unit 423, a reference picture cache 424 and a controller 425. The decoding engine 422 may invert coding operations applied by a coding engine at a video encoder (not shown). For example, the decoding engine may perform entropy decoding, re-quantization and inverse transform operations that may have been applied by the encoder. The decoding engine 422 may generate recovered video data which may be output from the video decoder 420 to the post-processor 430.

The reference picture cache 424 may store recovered video data of frames designated as reference frames. Thus, recovered reference frames may be output from the decoding engine 422 and stored in the reference picture cache 424 for use in decoding of subsequently-received coded video data.

The prediction unit 423 may retrieve data from a reference picture cache 426 for the coding engine 422 to use for predictive decoding operations. The coded video data may include motion vectors or other identifiers that identify locations within previously-stored references faces that are prediction references for subsequently-received coded video data. In response, the prediction unit 423 may retrieve the identified reference frame data and supply it to the decoding engine 422 for use in predictive decoding.

The post-processor 430 may apply signal conditioning operations to the recovered video (e.g., filtering) to improve quality of the recovered video. Typical post-processing operations may include applying deblocking filters, edge detection filters, ringing filters and the like. The post-processor 430 may output recovered video sequence for rendering on the display 440 or, optionally, stored to memory (not shown) for later retrieval and display.

As with the video encoding system (FIG. 3), the key frame source 460 of the video decoding system 400 may supply key frame data to the video decoder 420. Three embodiments are illustrated in FIG. 4. In a first embodiment, the key frame source 460 simply may be a frame generator 470 that generates an image having uniform content (e.g., white, black or grey). In this embodiment, the key frame has no image content.

In a second embodiment, the key frame source 460 may include a contacts manager 480 and storage 485 for contact images. In this embodiment, responsive to a decoder identifier (source not shown), the key frame source 460 may retrieve an image associated with the decoder and supply the image to the video decoder 420. The contact image may be, for example, a picture of an operator that uses the decoder.

In another embodiment, the key frame source 460 may include an archive manager 490 and storage 495 for images generated in a prior coding session between the encoder and decoder. In this embodiment, responsive to a decoder identifier (source not shown), the key frame source 460 may retrieve an image from the archive storage and may supply the image to the video decoder 420.

In a video coding system (FIG. 2) that supports transmission of video in a single direction only, a video decoding system 400 as illustrated in FIG. 4 may be supplied in a receiving terminal 220 only. In a video coding system that supports bidirectional transmission of video, both terminals 230, 240 may include their own video decoding systems 400.

Figure 5:
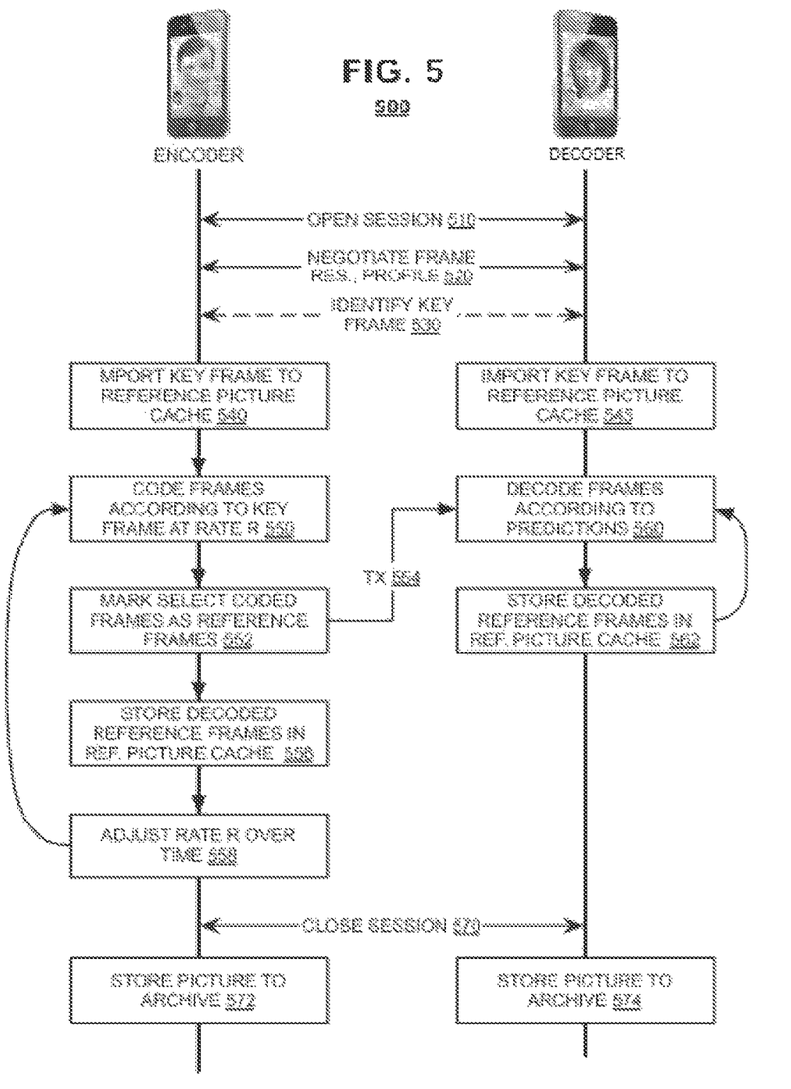
FIG. 5 illustrates methods of operation of an encoder and decoder to establish a video coding session according to an embodiment of the present invention.

FIG. 5 illustrates methods of operation 500 of an encoder and decoder to establish a video coding session according to an embodiment of the present invention. The method 500 may begin when the encoder and decoder exchange signaling to open a communication session between them (box 510). As part of the signaling, the encoder and decoder may exchange signaling to define a resolution of coded frames to be supplied by the encoder to the decoder and other data defining a coding profile to use during the session (box 520). If the encoder and decoder support multiple types of key frames, the encoder and decoder may exchange signaling to identify a type of inferred key frame to be used during coding (box 530). Once the key frame has been identified, the encoder and decoder both may import the key frame to their respective reference picture caches for use in prediction (boxes, 540, 545). Thereafter, the encoder may begin coding of video data for delivery to the decoder.

At the encoder, the encoder may code frames using the key frame as a basis of prediction (box 550), may mark select coded frames as reference frames (box 552) and may transmit the coded frames to the decoder (transmission 554). The encoder also may decode the coded reference frames and store the reconstructed reference frames in the encoder's own reference picture cache (box 556).

At the decoder, the decoder may receive coded frames and decode them according to prediction references contained within the coded video data (box 560). For frames marked as reference frames, the decoder may store reconstructed reference frame data in the decoder's reference picture cache (box 562). The decoder may repeat this operation for as long as the video coding session persists.

Figure 6:
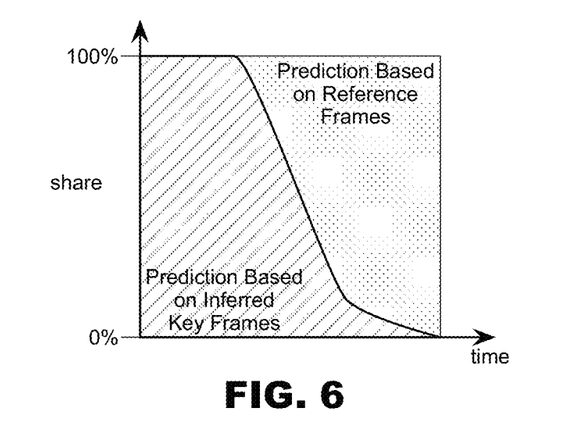
FIG. 6 is a graph illustrating transition between inferred key frames and reference pictures in an exemplary implementation of the present invention.

Over time, as the encoder generates increasing numbers of reference frames, the encoder may alter a rate R at which input frames are coded with reference to the inferred key frame (box 558). FIG. 6 is a graph illustrating transition between inferred key frames and reference pictures obtained from the coding session. When the video coding session is first initiated, for example for the first second of the session, an encoder may code a high percentage of input frames with reference to the inferred key frame to reduce the time delay between negotiation of session parameters and the time at which the decoder can successfully decode and render video. After the predetermined period of time concludes, over the next few second for example, the encoder may decrease the rate at which it uses inferred key frames as a reference for prediction. After the conclusion of this second period of time, the encoder may reduce (or eliminate altogether) the rate at which it uses the inferred key frame as a reference for prediction. Once the encoder determines that the utilization rate of the inferred key frame should be set to zero, it may evict the inferred key frame from the reference picture cache.

In an embodiment, at the conclusion of a video coding session, the encoder and decoder may exchange signaling to close the session (box 570). As part of this signaling, the encoder and decoder may select a frame available to both to be stored to an archive for use in a later video coding session (box 572, 574). Such frames may be based on coding quality indicators, indicators from face recognition units or other metrics that indicate the frame may be suitable for prediction operations. Once a frame is selected, the encoder and decoder both may store the selected picture in respective archives (boxes 572, 574).

In another embodiment, the operations illustrated in boxes 540-562 may be repeated in response to an error event that occurs during a video coding session. If an error is detected that can cause loss of prediction references, the operations of boxes 540-562 may be performed in lieu of sending an IDR frame. In this case, the utilization rate R may be reset to its original value and the coding operations of boxes 550-558 may be repeated until the coding session is reestablished.

The foregoing discussion has described operation of the embodiments of the present invention in the context of coding servers, distribution servers and client devices. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, computer servers or mobile computing platforms such as smartphones and tablet computers. Similarly, decoders can be embodied in integrated circuits, such as application specific integrated circuits, field programmable gate arrays and/or digital signal processors, or they can be embodied in computer programs that execute on personal computers, notebook computers, computer servers or mobile computing platforms such as smartphones and tablet computers. Decoders commonly are packaged in consumer electronics devices, such as gaming systems, DVD players, portable media players and the like and they also can be packaged in consumer software applications such as video games, browser-based media players and the like. And, of course, these components may be provided as hybrid systems that distribute functionality across dedicated hardware components and programmed general purpose processors as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:
1. A method of coding video data, comprising:
by an encoder, exchanging signaling with a decoder to open a new video coding session, the signaling including an identification of a key frame stored by the encoder and the decoder prior to onset of the video coding session,
coding input frames of a video sequence predictively according to motion-compensated prediction techniques, wherein
at an onset of the video coding session, the coding includes inter-coding a first input frame using the identified key frame as a prediction reference, and thereafter, the coding includes coding other input frames using the coded first input frame as a prediction reference.

2. The method of claim 1, wherein the coding further comprising selecting, at a selection rate, input frames to be coded using the key frame as a prediction reference, wherein the selection rate decreases over a predetermined period of time following the onset of the video sequence.

3. The method of claim 1, wherein the key frame is a coded frame archived from a prior session that included a same encoder and decoder as in the video coding session.

4. The method of claim 1, wherein the key frame is recalled from image content of a contact manager.

5. A method of coding video data, comprising:
by an encoder, exchanging signaling with a decoder to open a new video coding session, the signaling including an identification of a key frame stored by the encoder and a decoder prior to the onset of the video coding session,
coding frames of a video sequence predictively according to motion-compensated prediction techniques, wherein
when a transmission error is detected involving coded video data, the coding includes coding select input frame(s) using the identified key frame as a prediction reference, and
thereafter, the coding includes coding other input frames using the coded select frames as prediction references.

6. The method of claim 5, wherein, prior to the detected transmission error, the coding includes using decoded reference frame data as a prediction reference for input frames.

7. The method of claim 5, wherein the coding further comprising selecting, at a selection rate, input frames to be coded using the key frame as a prediction reference, wherein the selection rate decreases over a predetermined period of time following the transmission error.

8. The method of claim 5, wherein the key frame is a coded frame archived from a prior session that included a same encoder and decoder as in the video coding session.

9. The method of claim 5, wherein the key frame is recalled from image content of a contact manager.

10. A video coding system, comprising:
a transmitter to exchange signaling with a decoder to open a new video coding session, the signaling including an identification of a key frame stored by the coding system and the decoder to use as reference picture at an onset of the video coding session;
a coding engine to perform motion compensated predictive coding,
a local decoder to decode coded reference frames from the coding engine,
a reference picture cache to store decoded reference frame data,
a key frame cache to store key frame data, including the identified key frame, and
a prediction unit operable to supply prediction data to the coding engine from either the reference picture cache or the key frame cache.

11. The system of claim 10, wherein the key frame data is a coded frame archived from a prior session that included a same encoder and decoder as in the video coding session.

12. The system of claim 10, wherein the key frame data is recalled from image content of a contact manager.

13. A method of coding video data, comprising:
by an encoder, at an onset of a new video coding session, exchanging signaling with a decoder to open the video coding session, the signaling including an identification of a key frame stored by an encoder and the decoder prior to the onset of the video coding session,
during a video coding session, by a processing device, predictively coding frames of a video sequence according to motion-compensated prediction techniques, wherein
during a first mode of operation, the coding includes inter-coding an input frame using a decoded reference frame as a source of prediction for the input frame, the decoded reference frame being generated as part of the video coding session,
during a second mode of operation, the coding includes inter-coding another input frame using the identified key frame as a source of prediction for the other input frame.

14. Non-transitory computer readable medium having stored thereon program instructions, that when executed, cause a processing device to:
exchange signaling with a decoder to open a new video coding session, the signaling including an identification of a key frame stored by the processing device and the decoder prior to the onset of the video coding session,
predictively code, during a video coding session, frames of a video sequence according to motion-compensated prediction techniques, wherein
during a first mode of operation, the coding includes inter-coding an input frame using a decoded reference frame as a source of prediction for the input frame, the decoded reference frame being generated as part of the video coding session,
during a second mode of operation, the coding includes inter-coding another input frame using the identified key frame as a source of prediction for the other input frame.

15. A method of decoding video data, comprising:
by a decoder, exchanging signaling with an encoder to open a new video coding session, the signaling including an identification of a key frame stored by the encoder and the decoder prior to onset of the video coding session,
decoding a coded video sequence predictively according to motion-compensated prediction techniques, wherein
at the onset of a video coding session, the decoding includes decoding a first coded frame using the identified key frame as a prediction reference, and
thereafter, the decoding includes decoding other coded frames using the decoded first frame as a prediction reference.

16. The method of claim 15, wherein the key frame is a coded frame archived from a prior session that included a same encoder and decoder as in the video coding session.

17. The method of claim 15, wherein the key frame is recalled from image content of a contact manager.

18. The method of claim 15, wherein a rate at which coded frames rely upon the key frame as a prediction reference decreases over time.

19. A method of decoding video data, comprising:
by a decoder, exchange signaling with an encoder to open a new video coding session, the signaling including an identification of a key frame stored by the encoder and the decoder prior to onset of the video coding session,
reporting a transmission error to an encoder during a video coding session,
by the decoder, decoding coded frames predictively according to motion-compensated prediction techniques, wherein following detection of a transmission error, the decoding includes decoding select coded frame(s) using the identified key frame as a prediction reference, and thereafter, the decoding includes coding other coded frames using decoded select frames as prediction reference(s).

20. The method of claim 19, wherein the key frame is a coded frame archived from a prior session that included a same encoder and decoder as in the video coding session.

21. The method of claim 19, wherein the key frame is recalled from image content of a contact manager.

22. The method of claim 19, wherein a rate at which coded frames that rely upon the key frame as a prediction reference decreases over time.

23. A method of decoding video data, comprising:
during a video coding session, by a processing device, exchanging signaling with an encoder to open a new video coding session, the signaling including an identification of a key frame stored by the encoder and the processing device prior to onset of the video coding session,
predictively decoding frames of a video sequence according to motion-compensated prediction techniques, wherein
during a first mode of operation, the decoding includes inter-decoding a coded frame using a decoded reference frame as a source of prediction for the coded frame, the decoded reference frame being generated as part of the video coding session,
during a second mode of operation, the decoding includes inter-decoding another coded frame using the identified key frame as a source of prediction for the other coded frame.

24. Non-transitory computer readable medium having stored thereon program instructions, that when executed, cause a processing device to:
exchange signaling with an encoder to open a new video coding session, the signaling including an identification of a key frame stored by the encoder and the processing device prior to onset of the video coding session,
predictively decode, during a video coding session, frames of a video sequence according to motion-compensated prediction techniques, wherein
during a first mode of operation, the decoding includes inter-decoding a coded frame using a decoded reference frame as a source of prediction for the coded frame, the decoded reference frame being generated as part of the video coding session,
during a second mode of operation, the decoding includes inter-decoding another coded frame using the identified key frame as a source of prediction for the other coded frame.

25. A video decoding system, comprising:
a transmitter to exchange signaling with an encoder to open a new video coding session, the signaling including an identification of a key frame stored by key frame cache to use as reference picture at an onset of new video coding session;
a decoding engine to perform motion compensated predictive decoding,
a reference picture cache to store decoded reference frame data,
a key frame cache to store key frame data, including the identified key frame, and
a prediction unit operable to supply prediction data to the coding engine from either the reference picture cache or the key frame cache.

26. The system of claim 25, wherein the key frame data is a coded frame archived from a prior session that included a same encoder and decoder as in the video coding session.

27. The system of claim 25, wherein the key frame data is recalled from image content of a contact manager.

* * * * *